D. S. Wooster.
6380X
Spinning Mach.
Patented Feb. 14, 1831.
No Printed Specification Available
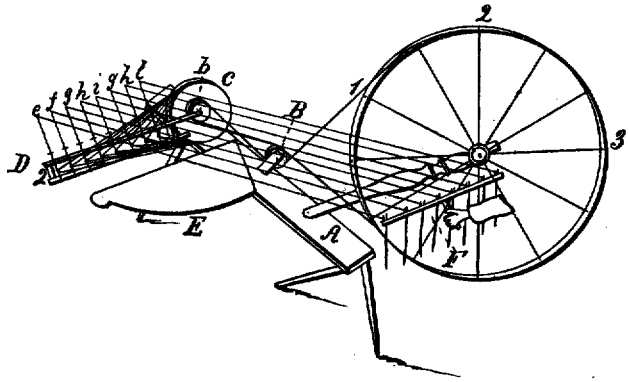
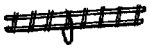
N. PETERS, PHOTO-LITHOGRAPHER, WASHINGTON, D. C.

Feb 14 1831 [illegible]

6380X

David S. Worster Sheldon 1.3[illegible]

Letters Patent

A

The Schedule referred to in these Letters Patent and making part of the same containing a description in the words of the said David S. Worster [illegible] of his Improvement in the machine for spinning wool To all to whom these presents shall come:

Be it known that I David S Worster of Sheldon in the County [illegible] and State of New York have invented a new and useful improvement in spinning wool and that the following is a full and exact description of the construction and operation of the said Machine as invented or improved by me. The principal invention consists in the [illegible] and [illegible] [illegible].

A The bench and rim, as common wheels except that they are somewhat larger, or the machinery may be put on a common wheel bench.

1 2 3 4 5 6 pieces thin board, put across the rim with notches to keep the band from sliding; and are fastened with small screws.

B The upright wheel with two scores, to pass the band from the rim to the horizontal pulleys and is about 3 inches in diameter.

C The horizontal pulley 8 inches in diameter & [illegible] which on said pulley around which the band passes to give motion to the spindles, are 2 [illegible] inches in diameter D The frame which contains the spindles and is made of small pieces of timber, sufficient to contain the cans, the bottom is [illegible] one; it is about 3 inches wide, to put a large screw in to hold it to the bench and then [illegible] to a slot in the bench for the screw and to tighten the band. E, f, g, h, i, j, k, l. The spindles with their [illegible] wheels and cans. The [illegible] in the frame D are the cans which are made of [illegible] [illegible] [illegible] the [illegible] [illegible] [illegible] and [illegible] [illegible] in the [illegible] [illegible] [illegible] [illegible] [illegible] enough to go on the spindles and then [illegible] [illegible] upon a [illegible] [illegible] to the spindle to keep [illegible] [illegible] [illegible] [illegible] [illegible] [illegible] [illegible] [illegible] [illegible] [illegible] [illegible]

and are confined by a piece of leather put around them, and through the
timber; &c. are posts about 8 inches long to hold the frame together.
The small bands should be made of cotton and looped neatly at each
end then put a small wire hook in one end and hook it in the other
then it can be unhooked and untwist or tighten or loosen the bands
No. The table to lay the hand machine on for joining the rolls &c and is a
board long enough to contain said machine and is fastened to the machine
No. The hand machine which is made of two small pieces of timber; and
are attached together by a spring of iron or steel passing through the hand
so that they will open and shut at pleasure by means of another
small thumb spring to hold it together the length of which pieces is eigh-
teen or twenty inches and there are wires put in the lower piece passing
the upper, to keep the rolls in their proper place and far enough apart to keep
them from tangling.

The machine may be used in this way with a vine and
block or by making the horizontal pulley twelve inches in diameter, it
can be used with a band or cord passing around a sheive in a pulley block
at the other end and fastened to something immoveable.

If used with a band and pulley the spinner takes hold of the
band with one hand, with the hand, or roll machine in the other;
and turning gently backward draws the thread sufficiently fine, then
[illegible] work the hand forward and draw the same part of the band back
with a quick motion, then when the hand is drawn back seize the other
part of the band and then [illegible] with the same quick motion; repeating
said motion till there is twist enough.

By making the frame of the head long enough to pass
the horizontal pulley and fixing it firmly it can be attached to the wall
of a house and supersede the necessity of a bench and vine....

The benefits arising from said machine are [illegible] and [illegible]
[illegible] for the same time that would spin one, on the common wheel
would spin three or this.

Test. [illegible] [illegible] [illegible] David S. [illegible]
[illegible] James W. Hall [illegible]